UNITED STATES PATENT OFFICE.

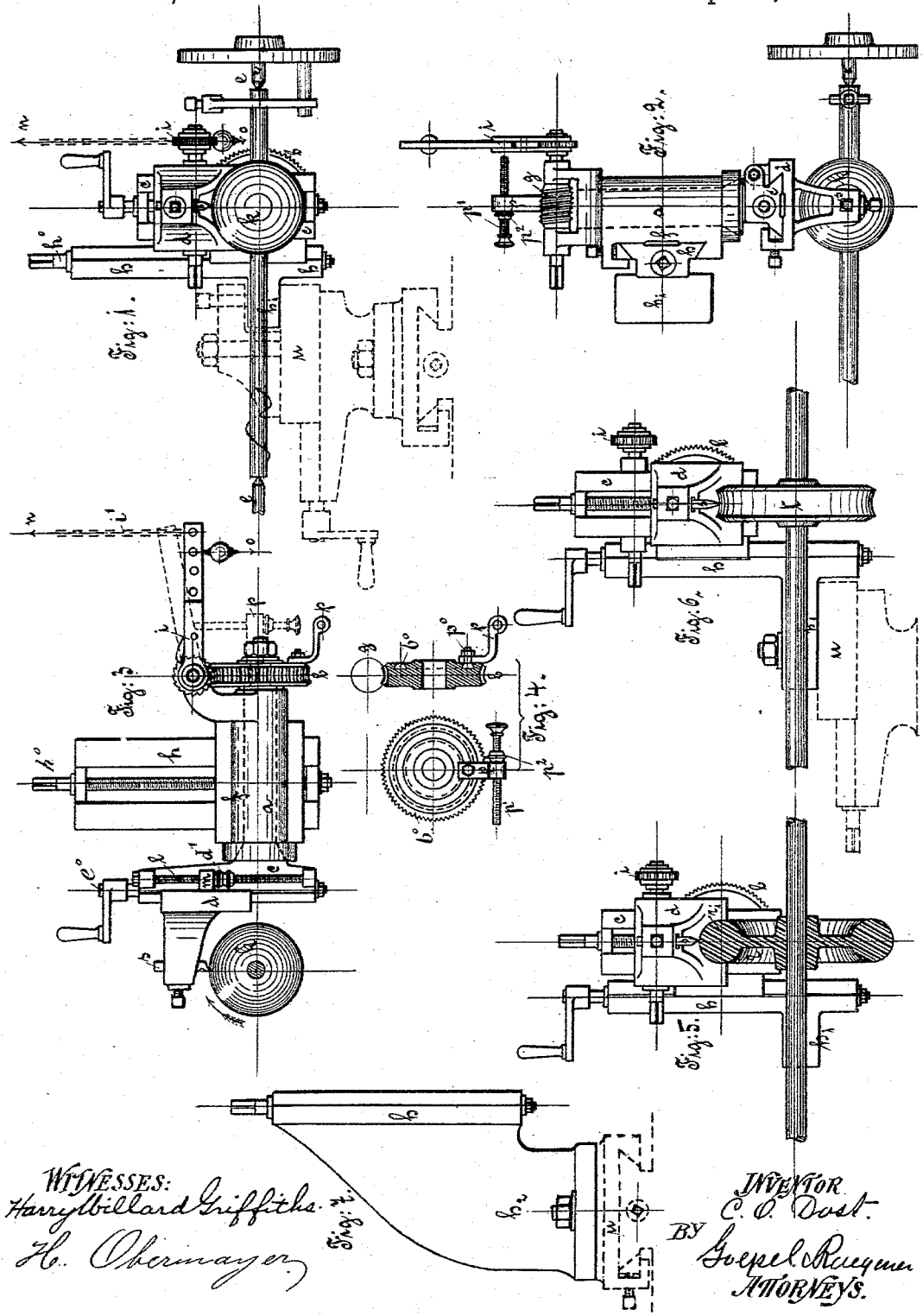

CARL OTTO DOST, OF MAGDEBURG, GERMANY.

DEVICE FOR SPHERIC TURNING.

SPECIFICATION forming part of Letters Patent No. 494,737, dated April 4, 1893.

Application filed April 19, 1892. Serial No. 429,765. (No model.)

*To all whom it may concern:*

Be it known that I, CARL OTTO DOST, a subject of the Emperor of Germany, residing at Magdeburg-Neustadt, in Germany, have invented a certain new and useful Device for Spheric Turning, of which the following is a specification.

This invention relates to an attachment for spherical turning with a horizontal spindle, by means of which balls, hand-wheels and round portions of machinery with concave or convex surfaces can be turned on any lathe.

In the accompanying drawings Figure 1 is a front elevation of my improved round turning apparatus adjusted for turning a ball. Fig. 2, is a plan-view of the same. Fig. 3, is a side-view of the same. Fig. 4, is a detail (sectional plan and front view) of the automatic stopping device. Fig. 5, is an elevation of the round turning device adjusted for turning a hand-wheel, and Fig. 6, is a similar view, showing the same adjusted for turning a grooved wheel, and Fig. 7, is a side-view of a modification of the standard used in the machine.

Similar letters of reference indicate corresponding parts.

To one end of the axle $a$ the worm-wheel $b$ is attached and to the other end the block $c$. The slide-rest $d$ of the block $c$ is arranged as a holder for the turning-tool $s$, which slide-rest is adjusted by means of a spindle $c^\circ$. The axle $a$ is horizontal and movably placed in the slide-rest $f$. The slide-rest $f$ is adjustable by means of a spindle $H^\circ$ on a vertical prismatic bearing of the standard $h$. This standard $h$ is provided at its rear with a projection $h'$, by means of which the whole apparatus can be inserted into the tool-holder of a lathe support, as shown in dotted lines in Fig. 1, like an ordinary turning-tool; or the said standard may be firmly screwed on the upper sliding-rest $u$ of the lathe-support, as shown in Fig. 6; or the turning-attachment can be held by means of a special standard $h^2$ on the support of the lathe, as shown in Fig. 7. If a ball is to be turned in this apparatus, the horizontal shaft $a$ is brought into the exact level of the lathe-centers $e$ $e$ by moving the same upward or downward in the standard $h$. By revolving the shaft $a$ to the right or left, the tool $f$ describes a circle, exactly concentric to the center of rotation, whereby the body inserted into the lathe is turned into a ball $k$. The tool $s$ in this case stands above the lathe-center, or the shaft $a$ and the size of the ball is regulated by the adjustment of the tool toward or from the shaft $a$. In order to fix this adjustment of the tool and thereby to produce any quantity of articles of exactly the same size, the spindle $l$ is inserted laterally in the block $c$, which spindle is provided with two nuts $l'$, which can be clamped firmly at any part of the spindle by being screwed one against the other. As soon as the tool-holder or carrier $d$ has reached its allotted end-position, a projection $m$ fixed on the tool-carrier $d$ strikes against the stop thus formed by the nuts $l'$. The progressive movement of the tool for removing a continuous shaving on spherical bodies or the rotation of the shaft $a$ is produced by the rotation of the worm $g$ which engages the worm-wheel $b$, which rotation may be produced either by hand, by means of the handles placed on the square part of the shaft of the worm, as shown in Fig. 2, or still better and more easily by means of a ratchet-lever $i$ on the shaft of the worm. This lever $i$ is provided at its end with holes into one of which a chain or cord $i'$ is hooked, the other end of which is connected with an automatic feed-attachment, such as is usually provided on lathes. This cord or chain draws the lever upward in the direction of the arrow $n$, Fig. 3, and thus turns the worm of the worm-shaft with the block $c$ and tool-carrier $d$ respectively. If the chain is released, a weight suspended beneath draws the lever $i$ back again in the direction of the arrow $o$, but without turning the worm. This operation is repeated automatically and the turning-tool would, if still moved forward, finally reach the spindle carrying the ball if the machine would not be stopped by the operator or the further movement automatically interrupted by a checking-device. Said checking-device is shown in Figs. 3 and 4. A wedge-shaped groove $b^\circ$ is turned in the face of the worm-wheel $b$ concentrically to its center and in the same a similarly shaped head of a screw $p^\circ$ is inserted, and this screw serves to attach at a suitable part of the worm-wheel an angle-piece $p$ provided with a set-screw $p'$ and a counternut $p^2$. If the apparatus has turned so far that the tool will shortly come in contact with the spindle carrying the ball, or if the movement is to be interrupted at any given point, the set-screw $p'$ on the angle-piece $p$ strikes against the ratchet-lever $i$ and stops the same, as shown in dotted lines in Fig. 3, in consequence of which the pawl of the ratchet-lever cannot operate any further and the movement of the turning-wheel is interrupted. Before commencing turning, the set-screw $p'$ on the angle-piece $p$ and the latter itself are adjusted on the worm-wheel $b$ at the proper place obtained by trials made by hand. For turning knobs or roundings for instance, for hand or crank-wheels $r$, Fig. 5, the shaft $a$ is vertically adjusted so high on the standard $h$ that its center line coincides exactly with the center-line in cross-section of the round knob $r'$, so that when the shaft $a$ is turned the tool $s$ will describe a circular course around said knob $r'$. For turning grooves in the rims of wheels, as shown in Fig. 6, the center line of the shaft $a$ is arranged sufficiently high above the groove to be made until the actual radius to which the groove is to be turned out is obtained. The cutting-edge of the tool must, however, in this case always stand below the axial center line, while, as stated, in case of balls or knobs the cutting-edge of the tool $s$ is situated above the axial center-line of the shaft $a$. The automatic starting and the automatic stopping-device for limiting the working may also be employed as previously described.

Having thus described my invention, I claim as new and desire to secure by Letters Patent—

1. A turning apparatus by means of which turning work on concave or convex lines can be produced on an ordinary lathe, consisting of the spindle bearing $f$, the spindle $a$, the worm-wheel $b$ on one end of the spindle, the prismatic guide $c$ on the other end of the spindle, an adjustable tool-holder in the prismatic guide $c$ and the standard $h$ provided with means for holding it on the lathe, substantially as set forth.

2. In a round or spheric turning attachment for lathes, the combination, with a spindle bearing, of a spindle in the same, a worm-wheel on said spindle, a worm engaging the worm-wheel and a ratchet and pawl for rotating the worm, a lever carrying the pawl and an automatic stop for said lever, substantially as set forth.

3. In a round or spheric turning attachment for lathes, the combination, with a spindle-bearing, of a rotative spindle in the same, a tool-carrier supported from said spindle, a worm-wheel on the spindle, a worm engaging the worm-wheel, a ratchet-wheel connected with the worm, a swinging pawl lever having a pawl engaging the ratchet-wheel and an adjustable stop on the worm-wheel for stopping the swinging-pawl-lever, substantially as set forth.

In testimony whereof I hereunto sign my name, in the presence of two subscribing witnesses, this 11th day of March, 1892.

CARL OTTO DOST.

Witnesses:
G. WESEMEYER,
W. EGGELING.